US011326330B2

(12) United States Patent
Saruta et al.

(10) Patent No.: US 11,326,330 B2
(45) Date of Patent: May 10, 2022

(54) TOILET MANAGEMENT SYSTEM AND MANAGEMENT DEVICE

(71) Applicant: LIXIL Corporation, Tokyo (JP)

(72) Inventors: Makoto Saruta, Tokyo (JP); Shoji Ogawa, Tokyo (JP); Hiroki Shigetomo, Tokyo (JP); Hideyuki Ida, Tokyo (JP); Rina Nagai, Tokyo (JP); Keita Matsudate, Tokyo (JP); Misaki Nagata, Tokyo (JP); Sadaaki Shichino, Tokyo (JP); Toshiki Hashida, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 16/971,299

(22) PCT Filed: Oct. 29, 2018

(86) PCT No.: PCT/JP2018/040060
§ 371 (c)(1),
(2) Date: Aug. 19, 2020

(87) PCT Pub. No.: WO2019/163202
PCT Pub. Date: Aug. 29, 2019

(65) Prior Publication Data
US 2020/0392710 A1    Dec. 17, 2020

(30) Foreign Application Priority Data

Feb. 20, 2018  (JP) .............................. JP2018-028231
Feb. 20, 2018  (JP) .............................. JP2018-028232

(Continued)

(51) Int. Cl.
*E03D 9/00*   (2006.01)
*G01F 23/00*  (2006.01)
*G01F 23/80*  (2022.01)

(52) U.S. Cl.
CPC ............. *E03D 9/00* (2013.01); *G01F 23/802* (2022.01)

(58) Field of Classification Search
CPC ....................................... E03D 9/00
(Continued)

(56) References Cited

U.S. PATENT DOCUMENTS 9,019,120 B2 *  4/2015  Broniak ................ G01F 15/07
                                              340/870.02
2005/0171634 A1  8/2005  York et al.
(Continued)

FOREIGN PATENT DOCUMENTS

CN   202929770 U   5/2013
CN   105735674 A   7/2016
(Continued)

*Primary Examiner* — Lori L Baker
(74) *Attorney, Agent, or Firm* — Morrison & Foerster LLP

(57) ABSTRACT

A toilet management system includes a toilet bowl device installed in a toilet room, a management device configured to manage a use situation of the toilet bowl device, and a communication device configured to transmit use situation information related to the use situation of the toilet bowl device to the management device. The management device includes an acquirer configured to acquire the use situation information from the communication device, and an abnormality detector configured to detect an abnormality of the toilet bowl device or a facility or equipment installed inside or around the toilet room when the use situation information acquired by the acquirer matches a predetermined condition.

10 Claims, 7 Drawing Sheets

(30) Foreign Application Priority Data

Feb. 20, 2018 (JP) .............................. JP2018-028233
Feb. 20, 2018 (JP) .............................. JP2018-028234
Sep. 11, 2018 (JP) .............................. JP2018-169333

(58) Field of Classification Search
USPC ..................................................... 4/314, 300
See application file for complete search history.

(56) References Cited

U.S. PATENT DOCUMENTS

| | | |
|---|---|---|
| 2006/0005312 A1 | 1/2006 | Reddy et al. |
| 2006/0136075 A1 | 6/2006 | Sun et al. |
| 2007/0176774 A1* | 8/2007 | Jahrling .................. G07C 3/08 |
| | | 340/539.26 |
| 2008/0036594 A1* | 2/2008 | Kates .................... G01S 1/7034 |
| | | 340/541 |
| 2012/0026004 A1* | 2/2012 | Broniak .................. E03B 7/075 |
| | | 340/870.02 |
| 2012/0062382 A1* | 3/2012 | Taneff .................. G08B 21/245 |
| | | 340/573.1 |
| 2019/0045027 A1* | 2/2019 | Wei ......................... H04L 67/12 |

FOREIGN PATENT DOCUMENTS

| | | |
|---|---|---|
| CN | 205975860 U | 2/2017 |
| JP | 2002-21148 A | 1/2002 |
| JP | 2002-275992 A | 9/2002 |
| JP | 2007-58416 A | 3/2007 |
| JP | 2008-524702 A | 7/2008 |
| JP | 2010-244258 A | 10/2010 |
| JP | 2010-282309 A | 12/2010 |
| JP | 2014-214594 A | 11/2014 |
| JP | 2015-17363 A | 1/2015 |
| JP | 2017-31623 A | 2/2017 |
| JP | 2017-106199 A | 6/2017 |
| JP | 2017-146813 A | 8/2017 |
| JP | 2017-152029 A | 8/2017 |

\* cited by examiner

FIG. 3

| ERROR CODE | WATER LEVEL OF BOWL | CONTROLLER | DOOR OF TOILET ROOM | DOOR OF PRIVATE ROOM | WATER LEVEL OF WASHSTAND | FLOOR WATER LEAKAGE SENSOR | LIGHTING | VENTIL- ATION FAN | HUMAN SENSOR | TEMPE- RATURE SENSOR | ODOR SENSOR | SEATI- NG SENSOR |
|---|---|---|---|---|---|---|---|---|---|---|---|---|
| 001 | 100% | — | — | — | — | — | — | — | — | — | — | — |
| 002 | 80% | — | — | — | — | — | — | — | — | — | — | — |
| 003 | — | CONTINUOUS OPERATION OF FLUSHING BUTTON FOUR TIMES | — | — | — | — | — | — | — | — | — | — |
| 004 | — | PRIVATE PART CLEANING ON | — | OPEN | — | — | — | — | — | — | — | OFF |
| 005 | — | — | — | — | — | — | — | — | — | — | — | ON |
| .. | .. | .. | .. | .. | .. | .. | .. | .. | .. | .. | .. | .. |

| ERROR CODE | MANAGEMENT SUBJECT | CLEANING SUBJECT | MANUFACTURING SUBJECT | MAINTENANCE SUBJECT |
|---|---|---|---|---|
| 001 | 1 | 1 | 2 | 2 |
| 002 | 1 | — | 2 | 2 |
| 003 | 1 | — | 1 | 1 |
| 004 | 1 | 1 | 1 | 1 |
| 005 | 1 | — | 2 | 2 |
| ⋮ | ⋮ | ⋮ | ⋮ | ⋮ |

76

TOILET MANAGEMENT SYSTEM AND MANAGEMENT DEVICE

CROSS-REFERENCE TO RELATED APPLICATIONS

This application is a national stage application under 35 USC 371 of International Application No. PCT/JP2018/040060, filed Oct. 29, 2018, which claims the priority of Japanese Application No. 2018-028231, filed Feb. 20, 2018, Japanese Application No. 2018-028232, filed Feb. 20, 2018, Japanese Application No. 2018-028233, filed Feb. 20, 2018, Japanese Application No. 2018-028234, filed Feb. 20, 2018, and Japanese Application No. 2018-169333, filed Sep. 11, 2018, the entire contents of each of which are incorporated herein by reference.

FIELD OF THE DISCLOSURE

The present disclosure relates to a toilet management system for managing a use situation of a toilet bowl device installed in a toilet room, and a management device usable for the toilet management system.

BACKGROUND OF THE DISCLOSURE

A toilet is indispensable facility both in houses where people live and in facilities that people use. Because the toilet tends to get dirty or produce an odor, it is important to keep the toilet clean to make a house or a facility a comfortable space. In particular, toilets installed in commercial facilities, entertainment facilities, complex facilities, passenger station facilities, and the like which are used by many people need to be properly kept clean from the viewpoint of public health.

SUMMARY OF THE DISCLOSURE

When abnormality occurs in the toilet, the toilet may not be used depending on the contents of abnormality, or sewage or an odor may spread around, which may lead to reduce the comfort of a space where people live or which people use. In particular, a toilet installed in a facility which can be used by unspecified people or many people is more frequently used and tends to be messed up as compared with a toilet installed in a house which is used by a few specific people, so the toilet is more likely to go through an abnormality. If an abnormality occurs in the toilet installed in the facility which is used by many people, the toilet can also be greatly affected by the abnormality.

The present disclosure has been made in view of such problems, and an object of the present disclosure is to provide a technology of appropriately managing a use situation of a toilet bowl device installed in a toilet room.

In order to solve the above problems, a toilet management system according to an aspect of the present disclosure includes a toilet bowl device installed in a toilet room, a management device configured to manage a use situation of the toilet bowl device, and a communication device configured to transmit use situation information related to the use situation of the toilet bowl device to the management device. The management device includes an acquirer configured to acquire the use situation information from the communication device, and an abnormality detector configured to detect an abnormality of the toilet bowl device or a facility or equipment installed inside or around the toilet room when the use situation information acquired by the acquirer matches a predetermined condition.

Another aspect of the present disclosure is a management device. The management device includes an acquirer configured to acquire use situation information related to a use situation of a toilet bowl device installed in a toilet room, and an abnormality detector configured to detect an abnormality of the toilet bowl device or a facility or equipment installed inside or around the toilet room when the use situation information acquired by the acquirer matches a predetermined condition.

Note that any combination of the above constituent elements, and expressions of the present disclosure that are compatible between a method, a device, a system, a recording medium, a computer program, and the like are also effective as an aspect of the present disclosure.

According to the present disclosure, it is possible to provide a technology of appropriately managing the use situation of the toilet bowl device installed in the toilet room.

BRIEF DESCRIPTION OF THE FIGURES

FIG. 3 is a diagram illustrating an example of conditions held in an abnormality detection condition holder according to some embodiments.

FIG. 4 is a diagram illustrating an example of conditions held in a notification condition holder according to some embodiments.

DETAILED DESCRIPTION OF THE DISCLOSURE

Figure 1:
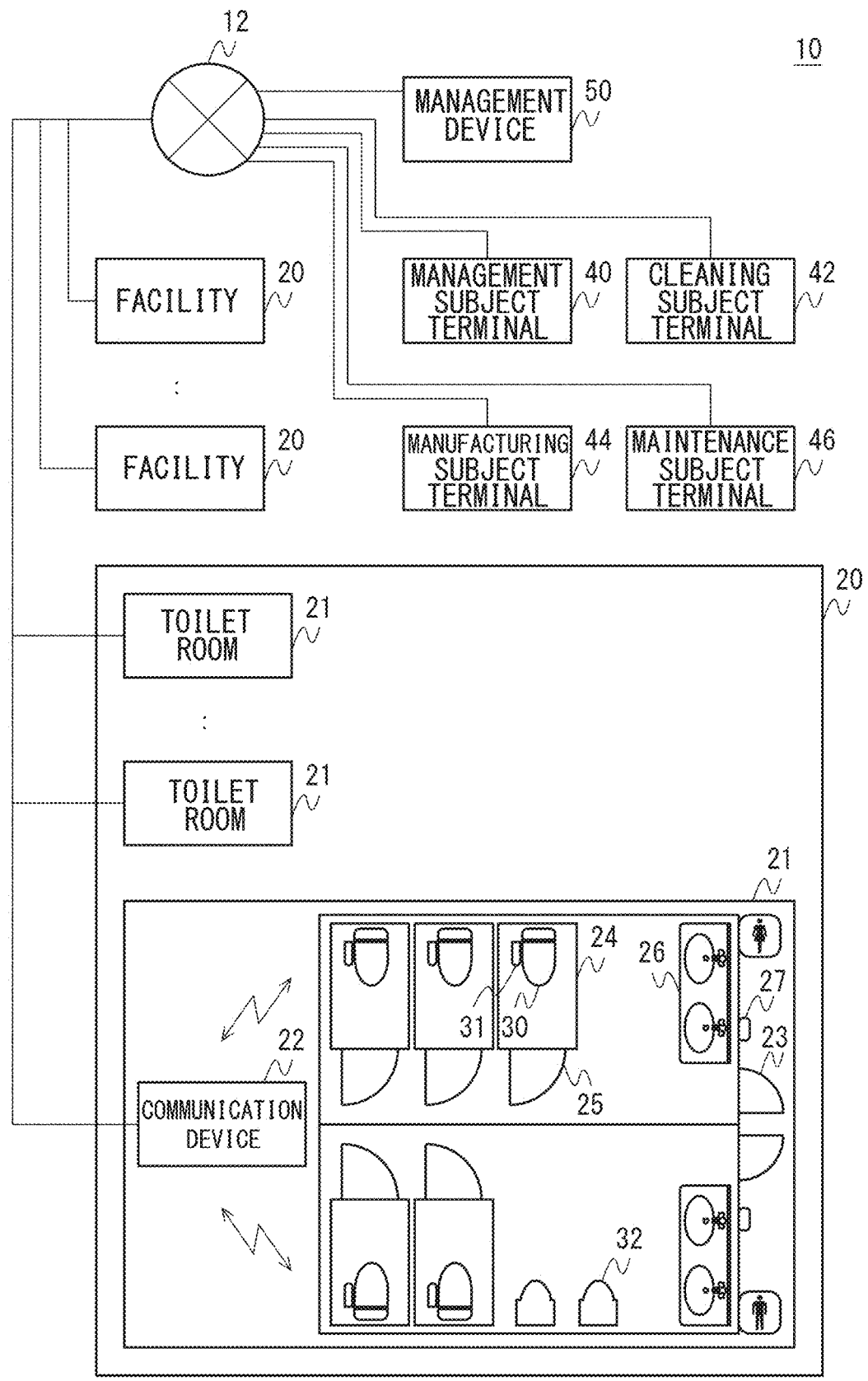
FIG. 1 is a diagram illustrating a configuration of a toilet management system according to some embodiments.

FIG. 1 illustrates a configuration of a toilet management system according to an embodiment. A toilet management system 10 includes a toilet bowl device 30 that is installed in a toilet room 21 of a facility 20, a management device 50 that manages a use situation of a toilet bowl device 30, a communication device 22 that transmits use situation information related to the use situation of the toilet bowl device 30 to the management device 50, a management subject terminal 40 of a subject managing the facility 20 in which the toilet room 21 is installed, a cleaning subject terminal 42 of a subject in charge of cleaning the toilet room 21, a manufacturing subject terminal 44 of a subject manufacturing the toilet bowl device 30 or a facility or equipment installed inside or around the toilet room 21, a maintenance subject terminal 46 of a subject in charge of maintenance of the toilet bowl device 30 or the facility or equipment installed inside or around the toilet room 21, and the Internet 12 that is an example of a communication means for performing communication between these devices.

The facility 20 is provided with at least one toilet room 21. The toilet room 21 includes a door 23 of the toilet room 21, a washstand 26, one or more private room 24, a door 25 of each private room 24, toilet bowl device 30 that is installed in each private room 24, a controller 31 for a user of the toilet bowl device 30 to input an operation instruction to the toilet bowl device 30, a urinal 32 that is installed in a toilet room 21 for men, and an abnormality notification means 27 that notifies an occurrence of an abnormality inside or around the toilet room 21 when an abnormality occurs in the toilet room 21. The management device 50 manages a use situation of one or more toilet bowl device 30 installed in one or more toilet room 21 of one or more facility 20. The toilet bowl device 30 may be a Japanese-style toilet bowl device or a Western-style toilet bowl device. Hereinafter, the urinal 32 is also referred to as the "toilet bowl device 30".

Figure 2:
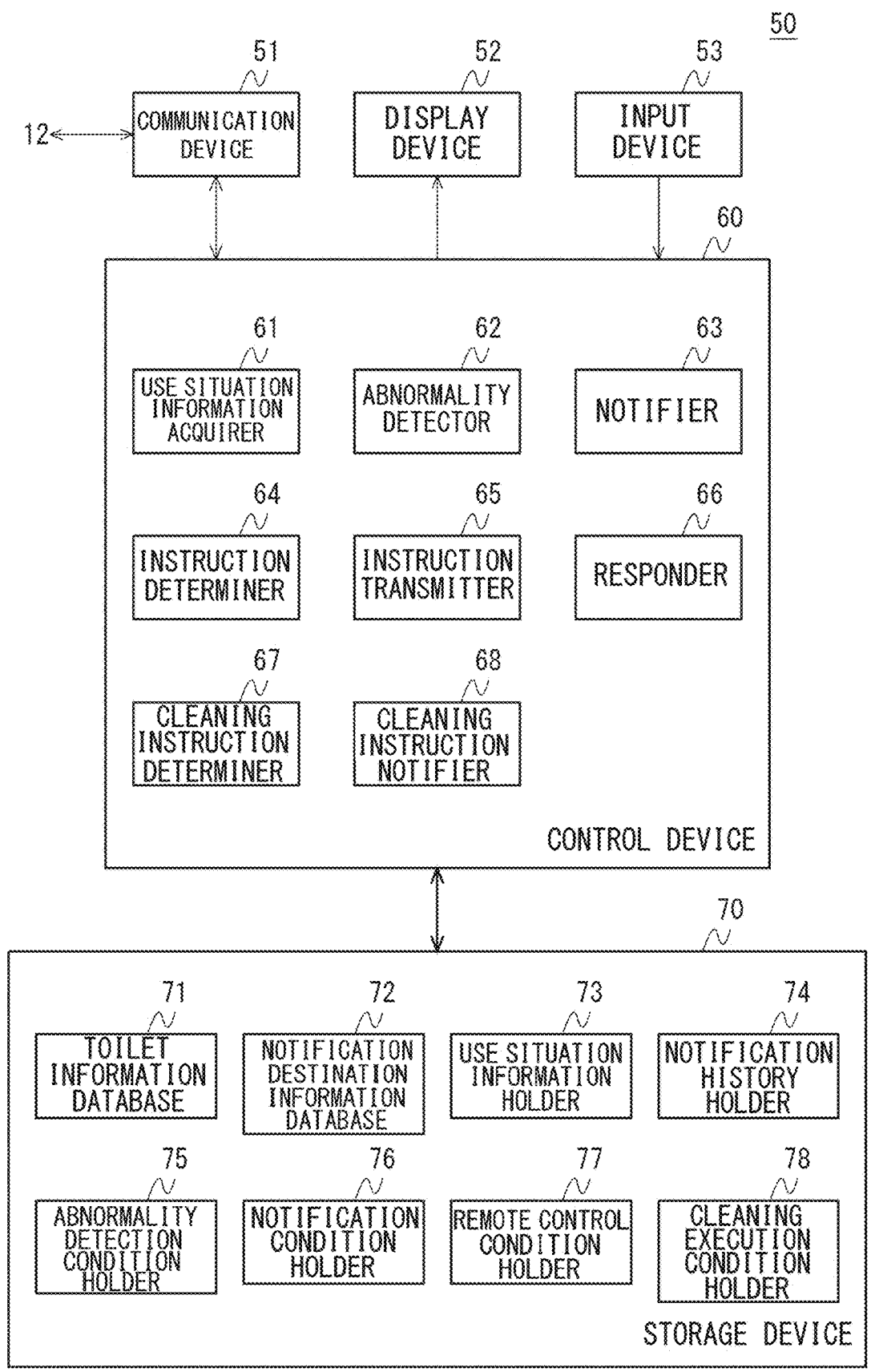
FIG. 2 is a diagram illustrating a configuration of a management device according to some embodiments.

FIG. 2 illustrates a configuration of the management device 50 according to an embodiment. The management device 50 includes a communication device 51, a display device 52, an input device 53, a storage device 70, and a control device 60. The management device 50 may be a server device, a device such as a personal computer, or a mobile terminal such as a mobile phone terminal, a smartphone, or a tablet terminal.

The communication device 51 controls communication with other devices. The communication device 51 may perform communication by using any wired or wireless communication method. The communication device 51 communicates with the communication device 22 via the Internet 12, receives the use situation information of the toilet bowl device 30, and transmits an instruction to the toilet bowl device 30. Further, the communication is performed between the management subject terminal 40, the cleaning subject terminal 42, the manufacturing subject terminal 44, and the maintenance subject terminal 46 via the Internet 12.

The display device 52 displays a screen generated by the control device 60. The display device 52 may be a liquid crystal display device, an organic EL display device, or the like. The input device 53 transmits the instruction input by the user of the management device 50 to the control device 60. The input device 53 may be a mouse, a keyboard, a touch pad, or the like. The display device 52 and the input device 53 may be mounted as a touch panel.

The storage device 70 stores programs, data, and the like which are used by the control device 60. The storage device 70 may be a semiconductor memory, a hard disk, and the like. The storage device 70 stores a toilet information database 71, a notification destination information database 72, a use situation information holder 73, a notification history holder 74, an abnormality detection condition holder 75, a notification condition holder 76, a remote control condition holder 77, and a cleaning execution condition holder 78.

The toilet information database 71 stores information of the facility 20, the toilet room 21, and the toilet bowl device 30, and the like which are managed by the management device 50. The toilet information database 71 stores information such as the number, positions, and floors of toilet rooms 21 installed in the facility 20, the number and positions of private rooms 24 installed in the toilet room 21, the number, models, manufacturing number, and manufacturing date of toilet bowl devices 30, a plan view of the toilet room 21, a connection relationship of water supply and sewage pipes connected to the toilet bowl device 30, and types, the number, positions of pieces of equipment or facilities installed inside or outside the toilet room 21.

The notification destination information database 72 stores information of a notification destination to be notified when an abnormality occurs in the toilet bowl device 30 or the like. The notification destination information database 72 stores information such as IP addresses of the management subject terminal 40, the cleaning subject terminal 42, the manufacturing subject terminal 44, and the maintenance subject terminal 46, a mail address of each person in charge that is a subject thereof, a telephone number, a fax number, a mobile phone number, priority of the notification means, and a time zone that can be notified.

The use situation information holder 73 stores the use situation information received from the communication device 22 provided in the toilet room 21 of the facility 20. The use situation information holder 73 stores the use situation information received from each communication device 22 and a reception date and time in association with each other. The use situation information accumulated in the use situation information holder 73 is used to detect abnormalities that occur in the toilet bowl device 30, the toilet room 21, or the like, determine instructions for the equipment, facilities, and the like of the toilet bowl device 30 or the toilet room 21, determine cleaning timing or contents, or the like of the toilet bowl device 30 or the toilet room 21, present availability or the like of the toilet room 21 to a user, and investigate maintenance, an increase/decrease, or the like of the toilet room 21 or the toilet bowl device 30 from the past use situation.

The notification history holder 74 holds a history of information notified from the management device 50 to the management subject terminal 40, the cleaning subject terminal 42, the manufacturing subject terminal 44, the maintenance subject terminal 46, the communication device 22, and the like. The notification history holder 74 stores a notification date and time, a notification destination, notification contents, presence or absence of response from the notification destination, a response date and time, response contents, and the like.

The control device 60 includes a use situation information acquirer 61, an abnormality detector 62, a notifier 63, an instruction determiner 64, an instruction transmitter 65, a responder 66, a cleaning instruction determiner 67, and a cleaning instruction notifier 68. These configurations are realized by a CPU, a memory, other LSI, and the like of an arbitrary computer in terms of hardware, and may be realized by a program or the like loaded in the memory in terms of hardware, but functional blocks realized by a combination thereof are depicted herein. Therefore, it will be understood by those skilled in the art that these functional blocks can be realized in various forms such as hardware alone or a combination of hardware and software.

The use situation information acquirer 61 acquires the use situation information of the toilet bowl device 30 installed in the toilet room 21 of the facility 20 from the communication device 22 and stores the acquired use situation information in the use situation information holder 73. The use situation information acquirer 61 acquires, as the use situation information of the toilet bowl device 30, information indicating a use state of the toilet bowl device 30, information indicating an operation condition of the controller 31, information indicating an opening/closing state of a door detected by an opening/closing sensor installed in a door 23 of the toilet room 21 or a door 25 of the private room 24, information indicating a water level in a toilet bowl detected by a water level sensor installed inside or outside the toilet bowl device 30 or a bowl of a urinal 32, information indicating a water level in a wash hand bowl detected by a water level sensor installed inside or outside the wash hand bowl of a washstand 26, information indicating a water leak state detected by a leak sensor installed on a floor around the toilet bowl device 30, the urinal 32, or the washstand 26, information indicating a use situation or condition of a facility or equipment such as a lighting or a ventilation fan installed inside or outside the toilet room 21, information detected by sensors such as a human sensor, a temperature sensor, and an odor sensor installed inside or outside the toilet room 21, information detected by sensors such as a seating sensor, a temperature sensor, and a water level sensor provided in the toilet bowl device 30, an image captured by an imaging device installed inside or outside the toilet room 21, a sound acquired by a microphone installed inside or outside the toilet room 21, and the like.

Abnormality Detection/Notification of Toilet

As a feature of the management device 50 of an embodiment, first, a technology of detecting an abnormality occurring in the toilet bowl device 30, the toilet room 21, or the like and notifying information on the detected abnormality will be described. The abnormality detector 62 detects an abnormality of the toilet bowl device 30 or a facility or equipment installed inside or around the toilet room 21 when the use situation information acquired by the use situation information acquirer 61 matches predetermined conditions stored in the abnormality detection condition holder 75.

FIG. 3 is a diagram illustrating an example of conditions held in an abnormality detection condition holder 75. The abnormality detection condition holder 75 stores the type and contents of the use situation information indicating the conditions under which it should be determined that an abnormality has occurred. The abnormality detector 62 refers to the use situation information holder 73 and the abnormality detection condition holder 75 every time the use situation information is acquired by the use situation information acquirer 61 or at a predetermined timing, for example, periodically at a predetermined interval to determine whether the use situation information matching the conditions held in the abnormality detection condition holder 75 is acquired, and if it is determined that the use situation information is acquired, the abnormality detector 62 instructs the notifier 63 to notify a subject of the occurrence of the abnormality according to the detected abnormality.

The notifier 63 determines a notification destination according to the contents of the abnormality detected by the abnormality detector 62 by referring to the notification condition holder 76, and notifies the determined notification destination of the information on the detected abnormality. The notifier 63 notifies the information necessary for the notification destination to examine necessary measures, in addition to an error code indicating the type of occurring abnormalities. For example, the notifier 63 may notify the information indicating the state of the toilet bowl device 30 or the toilet room 21, the captured image of the toilet bowl device 30 or the toilet room 21, and the like. The notifier 63 may directly notify the information on the detected abnormality to the terminal of the subject to be notified, may send the information on the detected abnormality to a representative telephone or a direct telephone of a company, an office, or the like, may transmit an email to a mail address, or may notify the information on the detected abnormality to a mobile phone or a mail address of a person in charge. The notifier 63 records information, such as the notification date and time, the notification destination, and the notification contents, in the notification history holder 74. When receiving the response from the notification destination, the notifier 63 displays the received response on the display device 52. The notifier 63 records the information, such as the presence/absence of response, the response date and time, and the response contents, in the notification history holder 74.

FIG. 4 is a diagram illustrating an example of conditions held in the notification condition holder 76. The notification condition holder 76 stores the error code indicating the type of occurring abnormalities, and a subject that should be notified of the occurrence of the abnormality and a priority of notification in association with each other. When the occurrence of the abnormality is detected by the abnormality detector 62, the notifier 63 refers to the notification condition holder 76 to obtain the notification destination to which the occurring abnormality should be notified, and refers to the toilet information database 71 and the notification destination information database 72 to acquire the notification destination information. The notifier 63 may notify a notification destination having a highest priority of the occurrence of the abnormality according to a priority of notification, and may notify a notification destination having a second highest priority of the occurrence of the abnormality when there is no response from the notification destination having the highest priority or when the notification destination does not respond to a call even when the call is originated, attempt to notify the notification destination having the highest priority of the occurrence of the abnormality plural times, or perform both of the notification to the notification destination having the second highest priority and the notification to the notification destination having the highest priority in parallel. The notifier 63 may notify a plurality of notification destinations in parallel at the same time.

Details of the abnormality to be detected and a specific example of the notification destination will be described below.

The abnormality detector 62 may determine that the abnormality occurs when the use situation information indicating the use situation of the toilet bowl device 30 matches the conditions held in the abnormality detection condition holder 75. For example, the abnormality detector 62 may determine that the abnormality occurs when acquiring the information indicating that the amount of water inside the bowl of the toilet bowl device 30 exceeds a predetermined value. If sewage overflows from the bowl due to clogging of a drainage pipe, the sewage may have a great influence not only on the inside of the toilet room 21 but also on the surroundings thereof, so it is very important to organize a system that promptly detects the overflow of the sewage and notifies an appropriate subject that can take necessary measures for operating facilities and the like.

The amount of water in the bowl of the toilet bowl device 30 may be detected by the water level sensor installed on an inner surface or an outer surface of the bowl of the toilet bowl device 30. When the water level sensor is installed on the outer surface of the bowl, a contactless water level sensor such as a capacitance type may be installed. In addition, the contactless water level sensor such as the capacitance type may be installed on an outer surface of a trap provided between a drainage port at a lower portion of the bowl and the drainage pipe. After the toilet bowl device 30 is used and then the bowl is washed with washing water and the sewage is drained, pooled water remains in the bowl at a portion below an upper end of the trap, but even after a predetermined time elapses from drainage, when the water level sensor installed on the outer surface of the trap detects that water remains at the upper end of the trap, it is estimated that the sewage in the bowl is not drained from the drainage pipe due to the clogging of the drainage pipe, and as a result, it may be determined that an abnormality occurs.

When the sewage actually overflows from the bowl, since it is necessary to clean the toilet room 21 and perform a measure or the like that temporarily limit an access of a user to the toilet room 21 and the surroundings thereof, the notifier 63 notifies a subject in charge of cleaning the toilet room 21 in which the toilet bowl device 30 in which the abnormality occurs is installed and a subject managing the toilet room 21 of the occurrence of the abnormality. In addition, when it is estimated from other information or the like that the cause of the occurrence of the abnormality is due to a malfunction of the equipment such as the toilet bowl device 30, a subject that manufactures the toilet bowl device 30 in which the abnormality occurs may also be notified of the occurrence of the abnormality, may be requested to provide information on equipment or facilities in which the malfunction occurs, or may take orders for parts. In addition, when it is estimated from other information or the like that the cause of the occurrence of the abnormality is due to a malfunction of equipment or facilities such as a drainage pipe or a pump, a subject in charge of maintenance of equipment or facilities of the drainage pipe or the pump may also be notified of the occurrence of the abnormality and may be requested to repair or replace the equipment or facilities.

When the abnormality that sewage overflows from the bowl is detected in the toilet bowl device 30 installed in the toilet room 21 installed on an upper floor of a building having a plurality of floors, the notifier 63 may notify a subject managing floors below a floor on which toilet room 21 is installed or a subject managing stores around a floor on which the toilet room 21 is installed of the information on the abnormality, in addition to a subject managing the floor on which the toilet room 21 is installed. When sewage actually overflows, since there is a risk that the sewage spreads to the floor of the toilet room 21 and is infiltrated into a ceiling below the floor, or water is leaked from a ceiling of a downstairs, a subject managing the downstairs or the surroundings thereof may be notified of the abnormality, so it is possible to takes promptly necessary measures and to suppress the influence to the minimum.

The notifier 63 may notify the abnormality notification means 27 installed inside or around the toilet room 21 of the occurrence of the abnormality. As a result, a user who is about to enter the toilet room 21 to use the toilet room 21 or a user of the facility 20 around the toilet room 21 can be notified that the abnormality has occurred in the toilet room 21, can be prevented from entering the toilet room 21, or can be urged to move away from an area around the toilet room 21. In addition, it is possible to make a person in charge of stores or the like around the toilet room 21 take appropriate measures such as ventilation and notification. In addition, it is possible to promptly notify a person in charge who goes around the toilet room 21 that the abnormality occurs in the toilet room 21.

According to such a technology, it is possible to significantly shorten the time required to take appropriate measures after the occurrence of the abnormality, so the influence of the abnormality can be minimized. In addition, since the toilet room 21 can be appropriately maintained and managed, the convenience of the user of the facility 20 can be improved, and the comfort and operation conditions of the facility 20 can be improved.

The abnormality detector 62 may determine that the abnormality occurs when the use situation information indicating the operation conditions of the controller 31 for the user of the toilet bowl device 30 to input the operation instruction to the toilet bowl device 30 matches the conditions held in the abnormality detection condition holder 75. For example, the abnormality detector 62 may determine that the abnormality occurs when acquiring the information indicating that the same button of the controller 31 is continuously operated plural times. When a button for performing a function that is not assumed to be continuously performed plural times is continuously operated plural times, since there is a problem in the button or the configuration for performing the function thereof and it is estimated that the user's desired function is not performed, it may be determined that the abnormality occurs in the controller 31 or the toilet bowl device 30 operated by the controller 31. The abnormality detection condition holder 75 may hold, as the conditions, a type of operable buttons, the number of times of operation of the button determined as abnormal, an operation interval of the button in which it is determined that the button is continuously operated in association with each other. In the buttons that are assumed to be continuously operated plural times such as a button for changing a volume of a sound masking device for the toilet, the number of times of operation of the button determined as abnormal may more increase than that of other buttons.

In the state in which the seating sensor of the toilet bowl device 30 does not detect the seating, when the information indicating that a button for performing a private part cleaning function is pressed is acquired, it is estimated that the seating sensor or the button is broken, so it may be determined that the abnormality occurs.

When the information indicating that the button for stopping the private part cleaning function is not pressed for a predetermined time after the private part cleaning function of the toilet bowl device 30 is performed is acquired, it is estimated that the private part cleaning function or the button is broken, so it may be determined that the abnormality occurs.

When the communication is regularly performed between the controller 31 and the toilet bowl device 30, if the information indicating that the controller 31 and the toilet bowl device 30 cannot communicate for a predetermined time or longer is acquired, it is estimated that the communication function of controller 31 or the toilet bowl device 30 is broken, the controller 31 has fallen or has been taken out and thus is out of a communicable coverage with the toilet bowl device 30, or a state of charge of a battery of the controller 31 is insufficient, so it may be determined that the abnormality has occurred.

The notifier 63 notifies the subject managing the toilet room 21 in which the controller 31 or the toilet bowl device 30 in which the abnormality occurs is installed and the subject in charge of maintenance of the controller 31 or the toilet bowl device 30 of the occurrence of the abnormality. In addition, when it is estimated from other information that the controller 31 or the toilet bowl device 30 in which the abnormality occurs needs to be repaired or replaced, the subject that manufactures the controller 31 or the toilet bowl device 30 may also be notified of the occurrence of the abnormality and take orders for necessary parts.

In this way, it is possible to promptly detect and notify the abnormality that is difficult for a person in charge of management to find even after going around the toilet room 21 based on the operation conditions of the controller 31 and take necessary measures, so the convenience of the user of the toilet room 21 can be improved, and the comfort and the operation conditions of the facility 20 can be improved.

When a function to change a temperature of the toilet seat or a temperature of hot water for private part cleaning stops by an administrator, and when the information indicating that a button for changing the temperature is operated a predetermined number of times or more is acquired, the subject managing the toilet room 21 can be notified that it is estimated that many users desire to change the temperature.

In this way, it is possible to estimate the request of the user of the toilet bowl device 30 from the operation conditions of the controller 31 and notify the management subject of the estimated request, so the environment of the toilet room 21 can be improved and the convenience of the user can be improved.

When the use situation information indicating the state of facilities or equipment installed inside or around the toilet room 21 matches the conditions held in the abnormality detection condition holder 75, the abnormality detector 62 may determine that the abnormality has occurred. For example, the abnormality detector 62 may determine that the abnormality has occurred when acquiring the information indicating that the time it takes for the door 23 of the toilet room 21 or the door 25 of the private room 24 to be closed and then reopened is less than a predetermined value. The abnormality detector 62 calculates statistical values such as an average staying time from a staying time history of the private room 24 or the toilet room 21 for each private room 24, each toilet room 21, or each facility 20 to calculate a predetermined value for determining that the abnormality has occurred.

When the user stays in the toilet room 21 or the private room 24 for the predetermined time, since there is a risk that the user may be in a poor physical condition, the notifier 63 notifies a subject managing the toilet room 21 in which the abnormality has occurred of the occurrence of the abnormality and notifies the subject to rush to the toilet room 21. In addition, when it is estimated from another information or the like that the malfunction of the door 23 or the door 25 or the malfunction of the opening/closing sensor of the door 23 or the door 25 occurs, the subject in charge of the maintenance of the toilet room 21 with the malfunction is notified of the occurrence of the abnormality. In addition, when it is estimated from other information or the like that the door 23, the door 25, or the opening/closing sensor in which the abnormality occurs needs to be repaired or replaced, the subject that manufactures the door 23, the door 25, or the opening/closing sensor may also be notified of the occurrence of the abnormality and takes orders for necessary parts.

As a result, since it is possible to promptly detect the case where the abnormality occurs and take appropriate measures even when the abnormality occurs in the user of the toilet room 21, the user can safely use the toilet room 21 and the facility 20 and the comfort and operating conditions of the facility 20 can be improved. Further, the abnormality of the facility or equipment installed inside or around the toilet room 21 as well as the toilet bowl device 30 can be detected promptly, so that the toilet room 21 can be appropriately maintained and managed.

The abnormality detector 62 may determine that the abnormality has occurred in the toilet bowl device 30 or the facility or equipment installed inside or around the toilet room 21 when a combination of any two or more of the pieces of information held in the use situation information holder 73 matches the predetermined conditions. The notifier 63 notifies the subject in charge of managing the toilet room 21 of the occurrence of the abnormality, and when it is estimated that the facility or equipment needs to be repaired, replaced, or the like, the notifier 63 requests the subject in charge of maintenance of the facility or equipment to repair or replace the facility or equipment with the abnormality, and may order the necessary parts to the subject that manufactures the facility or equipment.

When the information indicating that the door 23 of the toilet room 21 or the door 25 of the private room 24 is closed for the predetermined time or longer, and the toilet bowl device 30 installed in the toilet room 21 or the private room 24 is not used for the predetermined time or longer is acquired or when the information indicating that the door 23 of the toilet room 21 or the door 25 of the private room 24 is not opened even when the toilet bowl device 30 is used and then the predetermined time or more elapses is acquired, there is a risk that the abnormality has occurred in the user, so it may be determined that the abnormality has occurred.

When the door 23 of the toilet room 21 or the door 25 of the private room 24 is closed and then the toilet bowl device 30 is not used, and the door 23 or the door 25 is opened before the predetermined time elapses, it is estimated that the toilet bowl device 30 malfunctions or the toilet bowl device 30, the private room 24, or the toilet room 21 is dirty and the toilet bowl device 30 cannot be used, so it may be determined that the abnormality has occurred.

When the door 25 of the private room 24 is open and the information indicating that the toilet bowl device 30 is used is acquired, it is estimated that the opening/closing sensor of the door 25 or the toilet bowl device 30 malfunctions, so it may be determined that the abnormality has occurred.

When the toilet bowl device 30 is not used for a predetermined time or longer, it may be determined that the abnormality has occurred in the toilet bowl device 30 or in the toilet room 21 in which the toilet bowl device 30 is installed. The predetermined time may be calculated from the past usage frequency of the toilet bowl device 30 or the toilet room 21.

In the toilet bowl device 30 equipped with a hot water tank for private part cleaning, if the temperature of the hot water in the hot water tank does not change more than the predetermined value even though the private part cleaning function is executed, it is estimated that a valve for the hot water tank, a private part cleaning nozzle, or the like is broken, so it may be determined that the abnormality has occurred.

The abnormality detection conditions as in the above example may be automatically acquired by machine learning. For example, the contents of the abnormality when the abnormality actually occurs and the use situation information at that time are collected from the plurality of facilities 20, the toilet room 21, and the toilet bowl device 30, and the relationship between the use situation information and the contents of the abnormality may be learned by performing supervised learning using these actual data as teacher data. This machine learning may be executed by a server device or may be executed by a plurality of computers using a technology such as cloud computing. The learned condition may be delivered to the management device 50 at any time and stored in the abnormality detection condition holder 75. The management device 50 may include a learner that executes the machine learning. In this case, the learner acquires, from the notification destination notifying the abnormality detected by the abnormality detector 62, information on whether or not the abnormality actually has occurred or the information such as the contents of the abnormality, the state of the toilet room 21, the toilet bowl device 30, or the like, the taken measures, and the results of the measures when the abnormality has occurred, and may further learn abnormality detection conditions by executing the supervised learning using these pieces of information and the use situation information when it is determined that the abnormality has occurred as the teacher data to update the abnormality detection condition holder 75.

In this way, according to the technology of some embodiments, even if an abnormality occurs in the toilet room 21 or the toilet bowl device 30, it is possible to promptly detect the abnormality, notify the appropriate notification destination of the detected abnormality, and take necessary measures, so the influence of abnormality can be suppressed to the minimum. Further, since the occurrence of the abnormality is detected based on the information that can be collected from the toilet room 21 or the toilet bowl device 30, it is possible to suppress the cost of newly installing a sensor or the like for detecting the abnormality.

Cooperative Control of Plurality of Toilet Bowl Devices

Next, as a feature of the management device 50 of some embodiments, a technology of comprehensively managing the plurality of toilet bowl devices 30 installed in the toilet room 21 and instructing the plurality of toilet bowl devices 30 to execute a predetermined operation or function will be described. The instruction determiner 64 determines timing to instruct the toilet bowl device 30 to execute predetermined operation or function based on the use situation information of the plurality of toilet bowl devices 30. The instruction transmitter 65 transmits an instruction to the toilet bowl device 30 at the timing determined by the instruction determiner 64 to execute the predetermined operation or function.

Figure 5:
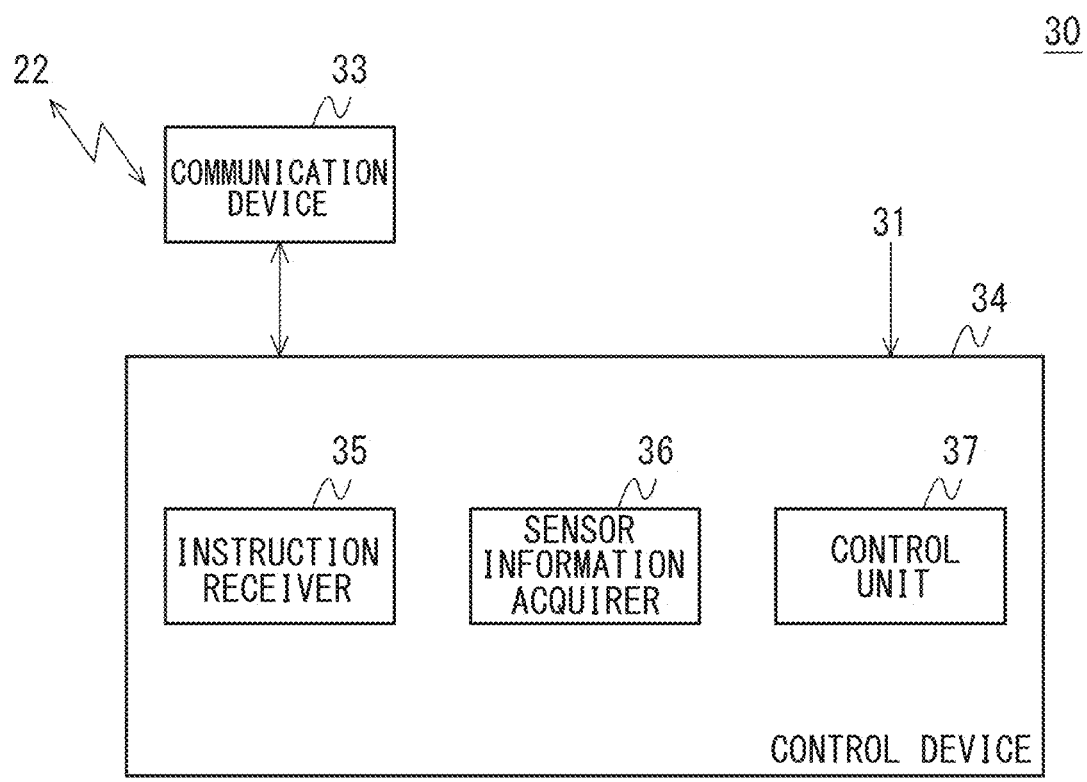
FIG. 5 is a diagram illustrating a configuration of a toilet bowl device according to some embodiments.

FIG. 5 illustrates a configuration of the toilet bowl device according to an embodiment. The toilet bowl device 30 includes a communication device 33 and a control device 34. The communication device 33 controls communication with other devices. The communication device 51 may perform communication by using any wired or wireless communication method. The communication device 51 communicates with the communication device 22 via the wired communication, transmits the use situation information of the toilet bowl device 30 to the management device 50, and receives an instruction to the toilet bowl device 30 from the management device 50.

The control device 34 includes an instruction receiver 35, a sensor information acquirer 36, and a control unit 37. These functional blocks can be realized in various forms such as only hardware or a combination of hardware and software.

The instruction receiver 35 receives an instruction to execute the predetermined operation or function from the management device 50. The sensor information acquirer 36 acquires the detected information from various sensors such as the seating sensor, the temperature sensor, and the water level sensor that are provided in the toilet bowl device 30. The control unit 37 controls functions such as the drainage and private part cleaning of the toilet bowl device 30 based on the information detected by various sensors acquired by the sensor information acquirer 36, and also executes the predetermined operation or function based on the instruction received by the instruction receiver 35.

The instruction determiner 64 of the management device 50 refers to the past use situation of the toilet bowl device 30 held in the use situation information holder 73 to determine timing to instruct the toilet bowl device 30 to execute the predetermined operation or function. For example, the toilet bowl device 30 may be instructed to turn on a heating function of the toilet seat before a predetermined time when the facility 20 is opened. In addition, the toilet bowl device 30 may be instructed to turn off the heating function of the toilet seat before or after a predetermined time when the facility 20 is closed. The toilet bowl device 30 may be instructed to change the temperature of the toilet seat according to a date and time, a season, weather, outside temperature, room temperature, and the like.

When the instruction determiner 64 causes the plurality of toilet bowl devices 30 to execute a predetermined operation or function that consumes power of a predetermined value or more, the instruction determiner 64 determines timing to instruct the toilet bowl device 30 to execute the predetermined operation or function so that the predetermined number or more of the toilet bowl devices 30 do not execute the operation or function at the same time. For example, since the function of turning on a heater in the toilet seat requires relatively large power, the plurality of toilet bowl devices 30 may be instructed with a time difference so as not to exceed power supply capacity or contract amperage of the facility 20.

When the instruction determiner 64 causes the plurality of toilet bowl devices to execute a predetermined operation or function involving water supply or drainage, the instruction determiner 64 determines timing to instruct the toilet bowl device 30 to execute the predetermined operation or function so that the predetermined number or more of the toilet bowl devices 30 connected to the same water supply pipe or drainage pipe do not execute the operation or function at the same time. For example, since the function of cleaning the toilet bowl involves draining a relatively large amount of washing water, the plurality of toilet bowl devices 30 may be instructed with a time difference so as not to exceed the capacity of the drainage pipes installed in the toilet room 21 and the facility 20.

The instruction determiner 64 determines timing to instruct the toilet bowl device 30 to execute the predetermined operation or function involving the drainage so that among the plurality of toilet bowl devices 30 connected to the same drainage pipe, the toilet bowl device 30 connected to an upstream side of the drainage pipe has a drainage frequency, a time, or a drainage volume more than those of the toilet bowl device 30 connected to a downstream side thereof. In order to prevent a urine stone from adhering to the toilet bowl device 30 and clogging of the drainage pipe, in the case of regularly performing the function of cleaning the toilet bowl device 30, since drainage flows from the toilet bowl device 30 on the upstream side to the drainage pipe on the downstream side, sufficient drainage flows to the drainage pipe on the downstream side even if the cleaning frequency of the toilet bowl device 30 on the downstream side is low, but only drainage flows from the toilet bowl device 30 to the drainage pipe on the upstream side. Therefore, by increasing the cleaning frequency, the time, or the drainage volume of the toilet bowl device 30 connected to the drainage pipe on the upstream side more than those of the toilet bowl device 30 connected to the drainage pipe on the downstream side, it is possible to appropriately clean the drainage pipe on the upstream side and the drainage pipe on the downstream while suppressing washing water from being unnecessarily consumed.

According to such a technology, when the management device 50 collectively controls the plurality of toilet bowl devices 30 remotely, it is possible to reduce the malfunctions that can occur when a plurality of toilet bowl devices 30 perform the same function all at once and smoothly and appropriately cooperate and remotely control the plurality of toilet bowl devices 30.

In executing the predetermined operation or function, the control unit 37 of the toilet bowl device 30 inquires of the management device 50 whether or not other toilet bowl devices 30 executing the operation or function exist around the toilet bowl device 30. The responder 66 of the management device 50 acquires information on the executing operation or function from the plurality of toilet bowl devices 30 and stores the acquired information in the use situation information holder 73, checks whether other toilet bowl devices 30 that are executing the predetermined operation or function exist around the toilet bowl device 30 when the toilet bowl device 30 inquires whether or not other toilet bowl devices 30 that are executing the predetermined operation or function exist around the toilet bowl device 30, and returns a response to the check. The control unit 37 of the toilet bowl device 30 determines whether or not to execute the operation or function or timing to execute the operation or function according to the response from the management device 50. For example, in executing a predetermined operation or function involving drainage, the control unit 37 inquires of the management device 50 whether or not other toilet bowl devices 30 that are executing the operation or function exists around the toilet bowl device 30, and stops or postpones the execution of the operation or function when there is a response from management device 50 that the other toilet bowl devices 30 exist.

According to such a technology, even when each toilet bowl device 30 is operated independently, it is possible to reduce the malfunctions that may occur due to interference with the surrounding toilet bowl devices 30 and operate the toilet bowl devices 30 in appropriate cooperation with each other.

Control of Each Toilet Bowl Device

Next, as a feature of the management device 50 of some embodiments, a technology of instructing each toilet bowl device 30 to execute the predetermined operation or function will be described. The instruction determiner 64 determines the contents and timing of the predetermined operation or function executed by the toilet bowl device 30 based on the use situation information of the toilet bowl device 30. The instruction transmitter 65 transmits an instruction to the toilet bowl device 30 at the timing determined by the instruction determiner 64 to execute the operation or function of the determined contents.

Figure 6:
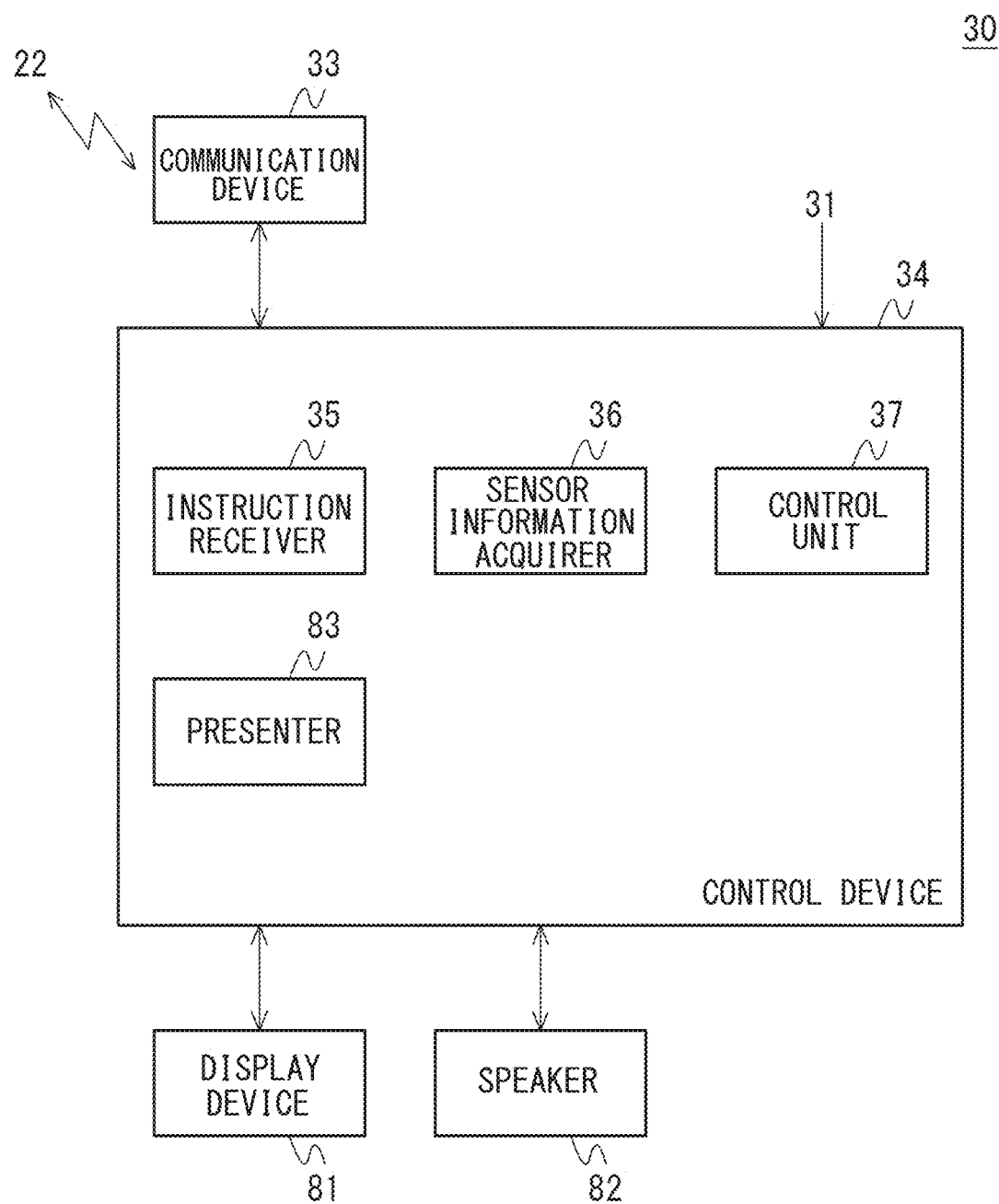
FIG. 6 is a diagram illustrating the configuration of the toilet bowl device according to some embodiments.

FIG. 6 illustrates a configuration of the toilet bowl device 30 according to an embodiment. The toilet bowl device 30 illustrated in FIG. 6 further includes a display device 81 and a speaker 82 in addition to the components of the toilet bowl device 30 illustrated in FIG. 5. In addition, the control device 34 of the toilet bowl device 30 illustrated in FIG. 6 further includes a presenter 83 in addition to the components of the control device 34 of the toilet bowl device 30 illustrated in FIG. 5.

The display device 81 displays a display screen generated by the control device 34. The speaker 82 outputs a sound generated by the control device 34. The display device 81 and the speaker 82 may be provided in a main body of the toilet bowl device 30, a washing water tank, or the like, may be provided on an inner wall of the private room 24, and may be provided on an inner side or an outer side of the door 25. The presenter 83 presents the information generated by each component of the control device 34 to a user via the display device 81 or the speaker 82.

First, a technology of solving a problem related to the use of the toilet bowl device 30 from the viewpoint of the user of the toilet bowl device 30 will be described.

(1) Stop of Cleaning Drainage Function

The instruction determiner 64 instructs the toilet bowl device 30 to stop a cleaning drainage function of the toilet bowl device 30 when the abnormality detector 62 detects the abnormality of the toilet bowl device 30. When the instruction receiver 35 receives an instruction from the management device 50 to stop the cleaning drainage function, the control unit 37 of the toilet bowl device 30 stops the cleaning drainage function, and does not drain the washing water even when a toilet bowl cleaning lever or a toilet bowl flushing button is operated by a user.

As described above, the situation where a management subject, a cleaning subject, and maintenance subject of the toilet bowl device 30 as well as the user of the toilet bowl device 30 most want to avoid is the situation where sewage overflows from the toilet bowl device 30. According to the toilet management system 10 of some embodiments, when any abnormality is detected, particularly when the water level sensor or the like detects that the water level in the bowl is a predetermined value or greater, or when an abnormality that may be a cause of the overflowing of sewage such as the clogging of the toilet bowl device 30 is detected, the cleaning drainage function of the toilet bowl device 30 forcibly stops, and as a result, it is possible to prevent the sewage from overflowing from the toilet bowl device 30 and suppress the pollution due to the sewage to the minimum.

As described above, the abnormality detector 62 may detect an abnormality when the value of the water level sensor provided in the toilet bowl device 30 exceeds the predetermined value. In this way, it is possible to prevent the sewage from overflowing from the bowl by causing the toilet bowl device 30 to drain the washing water when the sewage actually overflows or is about to overflow. Further, the abnormality detector 62 may detect the abnormality based on the detection result of the sensor other than the water level sensor, the use situation information of the toilet bowl device 30, and the like. For example, the sensor that detects the sound or vibration may be installed near the drainage pipe, and the abnormality may be detected based on the detected sound or vibration after the cleaning drainage function is executed by the toilet bowl device 30. In this case, the abnormality detector 62 may detect the abnormality when the sound or vibration that should be generated when the sewage flows through the drainage pipe even if the cleaning drainage function is executed is not generated, previously hold reference data such as intensity, duration, frequency and pattern of the sound or vibration that normally occurs when the sewage flows through the drainage pipe, compare the sound or vibration actually detected by the sensor with the reference data, and detect the abnormality when the difference from the reference data exceeds the predetermined range. As a result, it is possible to accurately detect the abnormality of the drainage pipe or the like regardless of whether or not the water level of the toilet bowl device 30 is abnormal, and it is possible to prevent the sewage from overflowing from the bowl by causing the toilet bowl device 30 to drain the washing water.

The instruction determiner 64 may calculate the amount of washing water that can be added to the toilet bowl based on the value of the water level sensor without the overflowing of the sewage from the bowl, and limit the amount of washing water to the calculated amount of washing water to instruct the toilet bowl device 30 to execute the cleaning drainage function. As a result, it is possible to attempt to prevent the clogging of the drainage pipe by additionally introducing the washing water into the bowl while preventing the sewage from overflowing.

When the abnormality of the toilet bowl device 30, the clogging of the drainage pipe, or the like is detected while the toilet bowl device 30 is executing the cleaning drainage function, the instruction determiner 64 may instruct the toilet bowl device 30 to stop the executing cleaning drainage function. As a result, it is possible to minimize the overflowing of the sewage even during the execution of the cleaning drainage function.

When the abnormality of the clogging of the drainage pipe or the like is detected, the instruction determiner 64 may instruct all the toilet bowl devices 30 draining the sewage to the drainage pipe to stop the drainage function. As a result, even when the toilet bowl device 30 itself has no abnormality, it is possible to prevent the sewage from overflowing by causing the toilet bowl device 30 to drain the washing water.

(2) Presentation that Cleaning Drainage Function has Stopped

When the instruction determiner 64 instructs the toilet bowl device 30 to stop the drainage function, the instruction determiner 64 instructs the toilet bowl device 30 to cause the presenter 83 to present that the cleaning drainage function stops because the abnormality is detected. The presenter 83 of the toilet bowl device 30 presents the user with that the cleaning drainage function stops because the abnormality is detected via the display device 81 or the speaker 82. In this way, it is possible to prevent the user from using the toilet bowl device 30 even if the cleaning drainage function stops, and prevent the sewage from overflowing or the dirt from remaining in the bowl. As described above, the presenter 83 may present that the cleaning drainage function of the toilet bowl device 30 stops because the abnormality is detected by the abnormality notification means 27 installed inside or around the toilet room 21.

(3) Presentation that Abnormality Detection has been Notified

When the notifier 63 notifies the management subject terminal 40, the cleaning subject terminal 42, the manufacturing subject terminal 44, or the maintenance subject terminal 46 that the abnormality has been detected, the instruction determiner 64 instructs the toilet bowl device 30 to cause the presenter 83 to present that it has been notified that the abnormality has been detected. The presenter 83 of the toilet bowl device 30 presents to the user via the display device 81 or the speaker 82 that the appropriate notification destination has been notified that the abnormality has been detected. In this way, when the user notices the abnormality of the toilet bowl device 30, it is possible to inform the user that there is no need to contact the management subject or the like, the user can feel relieved, so it is possible to improve the convenience of the user and, it is possible to prevent repeated contact with the management subject or the like.

(4) Automatic Lid Closing

When the abnormality detector 62 detects the abnormality of the toilet bowl device 30 by the abnormality detector 62, the instruction determiner 64 instructs the toilet bowl device 30 to close a lid of the toilet bowl device 30. The control unit 37 of the toilet bowl device 30 automatically closes the lid of the toilet bowl device 30. Thereafter, when it is detected that the user manually opens the lid, the control unit 37 automatically closes the lid again after a predetermined time elapses from the opening of the lid. The control unit 37 may be locked so that the lid is not opened. In this way, when the abnormality occurs in the toilet bowl device 30 and dirt can remain in the bowl, the lid is automatically closed to minimize the spread of odors.

(5) Automatic Locking of Door

The instruction determiner 64 instructs a device for controlling locking/unlocking of a door for an entrance/exit of the toilet room 21 or the door 25 of the private room 24 to lock the door or the door 25 when the abnormality detector 62 detects the abnormality of the toilet bowl device 30. The device for controlling the locking/unlocking of the door of the entrance/exit or the door 25 may be provided in the door or the door 25, may be provided in the toilet bowl device 30, or may be provided in the toilet room 21. When instructed to lock the door or the door 25, the device for controlling the locking or unlocking of the door or the door 25 automatically locks the door or the door 25. At this time, in particular, when automatically locking the door of the entrance/exit of the toilet room 21, the toilet bowl device 30 or the abnormality notification means 27 may be instructed to present the information of another available toilet room 21, private room 24, or toilet bowl device 30 so as to guide the user. In this way, it is possible to prevent the user from entering the toilet room 21 or the private room 24 having the toilet bowl device 30 in which the abnormality is detected and using the toilet bowl device 30, so it is possible to improve the convenience of the user and improve the efficiency of the management, cleaning, and maintenance of the toilet bowl device 30.

(6) Automatic Deodorization

The instruction determiner 64 instructs the toilet bowl device 30 to execute a deodorizing function of the toilet bowl device 30 when the abnormality detector 62 detects the abnormality of the toilet bowl device 30. The control unit 37 of the toilet bowl device 30 executes the deodorizing function. The deodorizing function is generally executed during or after the use of the toilet bowl device 30, and stops after a predetermined time elapses from the start of execution, but when the deodorizing function is automatically executed by the instruction from the management device 50, the measures for the abnormality are completed to make the toilet bowl device 30 return to the normal state, and the deodorization function continues until an instruction to stop is received from the management device 50, the management subject terminal 40, the cleaning subject terminal 42, the manufacturing subject terminal 44, or the maintenance subject terminal 46. As a result, it is possible to minimize the spread of odors generated by the occurrence of the abnormality.

(7) Re-Cleaning

The instruction determiner 64 instructs the toilet bowl device 30 to execute the cleaning drainage function when predetermined conditions are satisfied after stopping the cleaning drainage function of the toilet bowl device 30 because of the detection of the abnormality. The predetermined conditions are, for example, that the predetermined time elapses after the abnormality is detected, that the predetermined time elapses after the cleaning drainage function stops, that it is detected that the abnormalities such as the clogging of the drainage pipe are reduced or eliminated based on the use situation information of various sensors or equipment, and the like. As a result of the investigation by the applicant, it is known that most of the causes of the clogging of the drainage pipe in a toilet of a commercial facility, a public facility, or the like are due to the pouring of a large amount of toilet paper into the toilet at a time, but since the toilet paper is formed to be easily released in water, if the cleaning is made again after a while, the clogging due to the pouring of the toilet paper, which is the cause of the clogging of the drainage pipe may be eliminated. Therefore, the instruction determiner 64 instructs the toilet bowl device 30 to execute the cleaning drainage function and tries to clear the clogging of the drainage pipe when the predetermined time elapses after the abnormality is detected or after the toilet bowl device 30 is instructed to stop the cleaning drainage function. When it is detected that the clogging of the drainage pipe is eliminated by the re-cleaning, the instruction determiner 64 instructs the toilet bowl device 30 to withdraw the stop instruction of the cleaning drainage function and resume the normal operation, and instructs the toilet bowl device 30 and the abnormality notification means 27 to end the presentation that the abnormality has occurred, the cleaning drainage function has stopped, and the abnormality detection has been notified. When it is detected that the clogging of the drainage pipe is not eliminated even by the re-cleaning, the toilet bowl device 30 may be instructed to execute the cleaning drainage function after a predetermined time elapses. As a result, it is possible to eliminate the abnormality by automatically coping with most of the cases where the drainage pipe is clogged, so it is possible to significantly reduce the man-hours of the management subject, the cleaning subject, and the maintenance subject. Further, the abnormality of the toilet bowl device 30 can be eliminated early and the toilet bowl device 30 can be used, so it is possible to improve the convenience of the user.

The relationship with the problems between the control technology of the above toilet bowl device 30 and the use of toilet bowl device 30 from the viewpoint of the user will be described.

When the abnormality of the toilet bowl device 30 is found, the user thinks that he/she generates the abnormality while contacting the management subject or the like, or the user may hesitate to contact the management subject because he/she is afraid to lose his/her time due to reception of a question about the situation of the toilet bowl device 30 from the management agent. On the other hand, the user may feel anxious even if he/she leaves without contacting the management subject or the like. Such problems can be solved by the above-described abnormality detection/notification technology of the toilet, or (3) the presentation technology that the occurrence of the abnormality has been notified or the like among the individual toilet control technologies.

The user wants to avoid using the toilet bowl device 30 in which the abnormality has occurred or entering the toilet room 21 or the private room 24 in which the abnormality has occurred. Such problems can be solved by the above-described abnormality detection/notification technology of the toilet, or (2) the presentation technology that the cleaning drainage function has stopped or the like among the individual toilet control technologies.

The user wants to avoid seeing others' dirty or wants others to avoid seeing his/her own dirty when an abnormality occurs in the toilet bowl device 30 and dirty remains in the bowl. Such problems can be solved by the above-described abnormality detection/notification technology of the toilet, or (4) the automatic lid closing technology, (5) the automatic door locking technology, or the like, among the individual toilet control technologies.

The user wants to avoid the situation where sewage overflows by using the toilet bowl device 30 by himself/herself when the abnormality occurs in the toilet bowl device 30. Such problems can be solved by the above-described abnormality detection/notification technology of the toilet, or (1) the stop technology of the cleaning drainage function, or the like among the individual toilet control technologies.

The user wants to reduce the odor of the toilet room 21 and the private room 24 when the abnormality occurs in the toilet bowl device 30. Such problems can be solved by the above-described abnormality detection/notification technology of the toilet, or (6) the automatic odor technology or the like among the individual toilet control technologies.

The user wants to eliminate the abnormality early and enable the toilet bowl device 30 when the abnormality such as the clogging of the drainage pipe occurs. Such problems can be solved by the above-described abnormality detection/notification technology of the toilet, or (7) the re-cleaning technology or the like among the individual toilet control technologies.

Next, a technology of solving the problems related to the use of the toilet bowl device 30 from the viewpoint of the cleaning subject of the toilet bowl device 30 will be described.

(8) Automatic Cleaning According to Amount of Toilet Paper Used

As described above, since most of the causes of the clogging of the drainage pipe are that a large amount of toilet paper pours into the toilet at a time, the instruction determiner 64 instructs the toilet bowl device 30 to execute the cleaning drainage function when it is detected that a predetermined amount or more of toilet paper is used in order to reduce the pouring of a large amount of toilet paper into the toilet at one time. The control unit 37 of the toilet bowl device 30 executes the cleaning drainage function to forcedly pour the toilet paper into the drainage pipe. The use of the predetermined amount or more of toilet paper may be detected by, for example, the sensor installed in the toilet paper holder, or by a load cell, a passage sensor, a camera, or the like installed inside or near the bowl. In the former case, for example, the amount of the toilet paper used may be detected by detecting a rotation amount of roll-shaped toilet paper. In the latter case, the amount of toilet paper used is detected based on a weight of the toilet paper put into the bowl, the amount of toilet paper that passes through the passage sensor, an image obtained by capturing of the toilet paper put into the toilet bowl, or the like. When the cleaning drainage function is automatically executed, the presenter 83 may present to the user from the display device 81 or the speaker 82 that the cleaning drainage function is executed once because a large amount of toilet paper is used. In addition, the presenter 83 may alert the user from the display device 81 or the speaker 82 so that a large amount of toilet paper is not poured at a time. As a result, it is possible to reduce the situation where the drainage pipe is clogged due to the pouring of a large amount of toilet paper at a time, so it is possible to significantly suppress the occurrence of the abnormality in the toilet bowl device 30. Therefore, the man-hours of the management subject, the cleaning subject, and the maintenance subject can be significantly reduced, and the convenience of the user can be improved.

(9) Check if User is in Toilet in which Abnormality has Occurred

When the abnormality of the toilet bowl device 30 is detected by the abnormality detector 62, the notifier 63 checks whether the user is in the private room 24 in which the toilet bowl device 30 is installed based on the information acquired by the use situation information acquirer 61, and notifies the cleaning subject terminal 42 of the checked result. As a result, the cleaning subject can know whether or not it is possible to enter the private room 24 to clean the toilet bowl device 30 in which the abnormality occurs, so the cleaning efficiency can be improved. The instruction determiner 64 may instruct the toilet bowl device 30 to present the user to leave a room early because the cleaning subject enters the room for cleaning.

The relationship with the problems between the control technology of the above toilet bowl device 30 and the use of toilet bowl device 30 from the viewpoint of the cleaning subject will be described.

Even if the abnormality occurs in the toilet bowl device 30, the cleaning subject wants to suppress the overflow of sewage to the minimum. Such problems can be solved by the above-described abnormality detection/notification technology of the toilet, or (1) the stop technology of the cleaning drainage function, or the like among the individual toilet control technologies.

When the abnormality such as the clogging of the drainage pipe occurs, the cleaning subject wants to eliminate the abnormality early. Such problems can be solved by the above-described abnormality detection/notification technology of the toilet or (7) the re-cleaning technology, (8) the automatic cleaning technology according to the amount of toilet paper used, or the like, among the individual toilet control technologies.

Since the cleaning subject also may need to perform daily cleaning work, the cleaning subject wants to reduce the time and effort required for additional cleaning accompanied by the occurrence of the abnormality. In addition, even if an abnormality occurs, the cleaning subject wants to cope with the abnormality at a time zone of a fixed routine as much as possible. Furthermore, the cleaning subject wants to avoid immediately rushing to the toilet in which the abnormality has occurred. Such problems can be solved by the above-described abnormality detection/notification technology of the toilet, or (5) the automatic door locking technology, (7) the re-cleaning technology, or the like among the individual toilet control technologies.

Even if the cleaning subject rushes to the private room 24 to clean the toilet bowl device 30 in which the abnormality has occurred, the cleaning subject wants to reduce the situation where the user is in the toilet and thus the cleaning cannot be performed. Such problems can be solved by the above-described abnormality detection/notification technology of the toilet, or (2) the presentation technology that the cleaning drainage function has stopped, (3) the presentation technology that the abnormality detection has been notified, (5) the automatic door locking technology, (9) the check technology about whether the user is in the toilet in which the abnormality has occurred, or the like among the individual toilet control technologies.

The cleaning subject does not want to meet the user who is in the toilet when the cleaning subject rushes to the private room 24 to clean the toilet bowl device 30 in which the abnormality has occurred. This is the same for the user. Such problems can be solved by the above-described abnormality detection/notification technology of the toilet, or (9) the check technology about whether the user is in the toilet in which the abnormality has occurred or the like among the individual toilet control technologies.

The control technology of the individual toilet bowl devices described above can be executed for each toilet room 21, or can be executed by the individual toilet bowl devices 30 themselves. In the former case, the management device 50 may be provided in the toilet room 21. In the latter case, the management device 50 may be provided in the toilet bowl device 30, or the function of the management device 50 may be provided in the control device 34 of the toilet bowl device 30.

Figure 7:
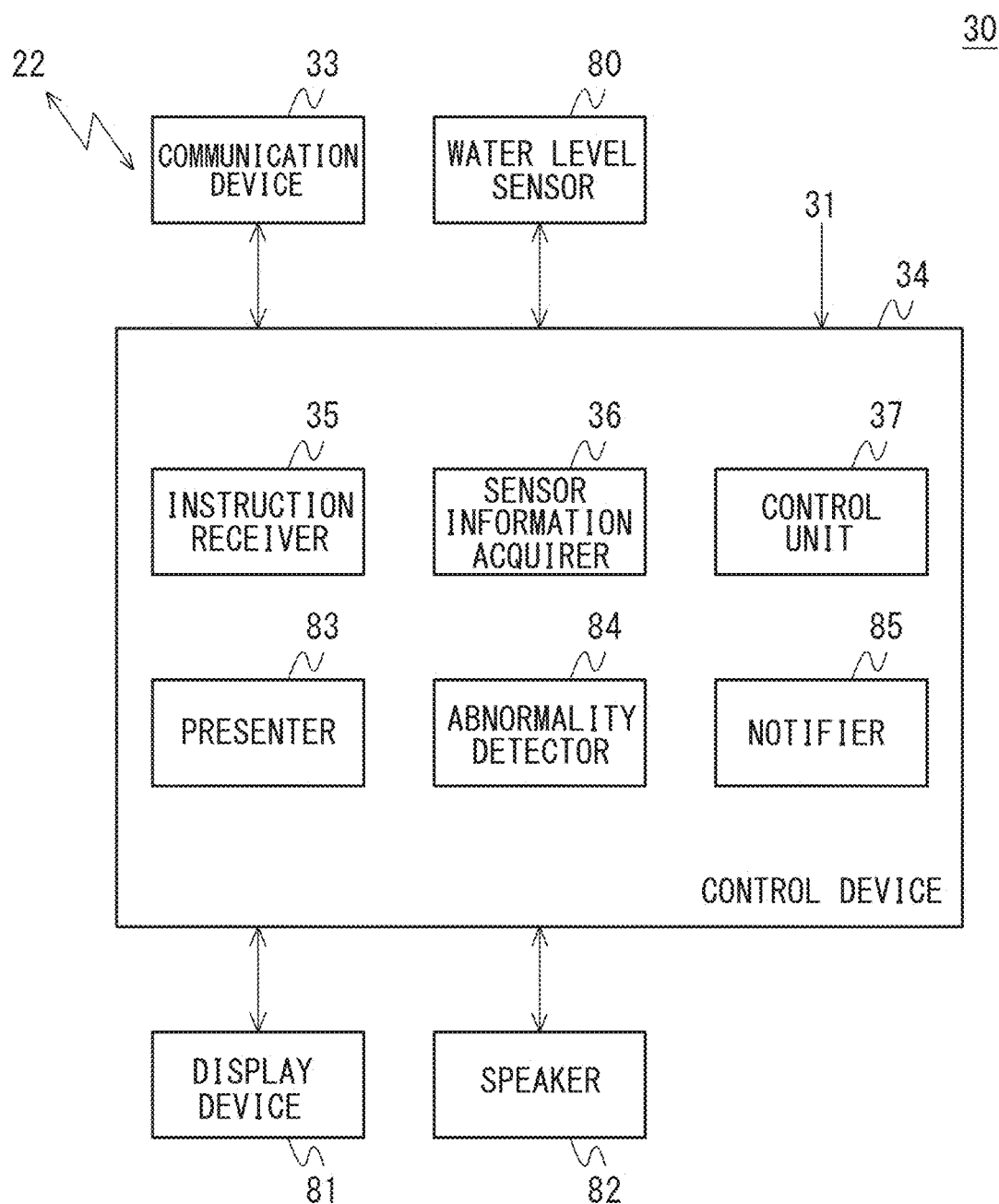
FIG. 7 is a diagram illustrating the configuration of the toilet bowl device according to some embodiments.

FIG. 7 illustrates a configuration of the toilet bowl device 30 according to an embodiment. The toilet bowl device 30 illustrated in FIG. 7 further includes a water level sensor 80 in addition to the components of the toilet bowl device 30 illustrated in FIG. 6. In addition, the control device 34 of the toilet bowl device 30 illustrated in FIG. 7 further includes an abnormality detector 84 and a notifier 85 in addition to the component of the control device 34 of the toilet bowl device 30 illustrated in FIG. 6.

The water level sensor 80 detects the amount of water inside the bowl of the toilet bowl device 30. As described above, the water level sensor 80 may be a contactless water level sensor such as a capacitance type provided on the outer surface of the bowl or the outer surface of the trap provided between the drain port and the drain pipe at the lower portion of the toilet bowl. The sensor information acquirer 36 acquires the water level detected by the water level sensor 80.

The abnormality detector 84 detects the abnormality of the water level when the detected water level exceeds a predetermined value. The abnormality detector 84 may detect the water level or other abnormalities based on the detection information of various sensors acquired by the sensor information acquirer 36, in addition to the water level detected by the water level sensor 80 or instead of the water level. For example, as described above, the water level and other abnormalities may be detected based on the detection information of the sound sensor or the vibration sensor installed near the drainage pipe.

The notifier 85 notifies the management device 50, the management subject terminal 40, the cleaning subject terminal 42, the manufacturing subject terminal 44, or the maintenance subject terminal 46 of the occurrence of the abnormality when the abnormality is detected by the abnormality detector 84.

The abnormality detection/notification described above can also be realized by the toilet bowl device 30 illustrated in FIG. 7. In this case, the function of the abnormality detector 62 is executed by the abnormality detector 84, and the function of the notifier 63 is executed by the notifier 85. Further, the control of each toilet bowl device described above can also be realized by the toilet bowl device 30 illustrated in FIG. 7. In this case, the function of the instruction determiner 64 is executed by the control unit 37.

The toilet bowl device 30 illustrated in FIG. 7 can realize the cooperative control of the plurality of toilet bowl devices described above by communicating with the management device 50 or other toilet bowl devices 30. Even in this case, the function of the instruction determiner 64 is executed by the control unit 37.

Cleaning Management of Toilet

As a further feature of the management device 50 of some embodiments, a technology of managing the timing or contents of the cleaning of the toilet room will be described. The cleaning instruction determiner 67 determines the timing or contents of the cleaning of the toilet room 21 based on the use situation information of the toilet bowl device 30. The cleaning instruction notifier 68 notifies the subject in charge of cleaning the toilet room 21 of the timing or contents determined by the cleaning instruction determiner 67.

The cleaning instruction determiner 67 refers to the use situation information holder 73 to determine the timing to clean the toilet room 21 so that the cleaning frequency of the toilet room 21 in which the installed toilet bowl device 30 is used more frequently is higher than that of the toilet room 21 in which the installed toilet bowl device 30 is used less frequently. The use frequency of the toilet bowl device 30 may be calculated from the information detected by the human sensor stored in the use situation information holder 73, the opening/closing state of the door 23 of the toilet room 21 and the door 25 of the private room 24, the use situation of the controller 31 or the drain lever, or the like. When a person in charge of cleaning cleans the toilet room 21 at the timing instructed by the management device 50, the cleaning subject terminal 42 transmits information indicating the cleaning state to the management device 50. The use situation information acquirer 61 stores the information indicating the cleaning state received from the cleaning subject terminal 42 in the use situation information holder 73. The cleaning instruction determiner 67 refers to the use situation information holder 73 to acquire the cleaning frequency of the toilet room 21.

The cleaning instruction determiner 67 may determine the contents of the cleaning of the toilet room 21 so that the number of items or a range of the cleaning of the toilet room 21 in which the installed toilet bowl device 30 is used more frequently is larger than that of the toilet room 21 in which the installed toilet bowl device 30 is used less frequently.

According to such a technology, by fulfilling the frequency and contents of the cleaning of the more frequently used toilet room 21, the cleaning frequency of the less frequently used toilet room 21 is suppressed while clearly maintaining the toilet room 21 where dirt is likely to occur, and as a result, it is possible to reduce the man-hours and burden on the person in charge of cleaning. In addition, since the cleaning frequency and contents of the toilet room 21 can be changed automatically and dynamically, the burden on the subject who manages the toilet room 21 can be reduced.

The present disclosure has been described above based on embodiments, but the embodiments merely show the principle and application of the present disclosure. Further, in an embodiment, many modifications and arrangements can be changed without departing from the spirit of the present disclosure defined in the claim.

In an embodiment, the example of managing the toilet bowl device installed in the toilet room of the facility has been described, but the technology of some embodiments can be applied to the case of managing a toilet of a general house, a public toilet installed in a park or on a street, or the like.

By generalizing the disclosure embodied by the above-described embodiment and modified examples, the following technical ideas can be derived.

A toilet management system according to an aspect of the present disclosure includes a toilet bowl device installed in a toilet room, a management device configured to manage a use situation of the toilet bowl device, and a communication device configured to transmit use situation information related to the use situation of the toilet bowl device to the management device. The management device includes an acquirer configured to acquire the use situation information from the communication device, and an abnormality detector configured to detect an abnormality of the toilet bowl device or a facility or equipment installed inside or around the toilet room when the use situation information acquired by the acquirer matches a predetermined condition. According to this aspect, the abnormality that occurs in the toilet room can be quickly detected, so the toilet room can be appropriately maintained and managed.

The use situation information may be the information indicating the use state of the toilet bowl device. The abnormality detector may determine that the abnormality has occurred when acquiring the information indicating that the amount of water inside the bowl of the toilet bowl device exceeds a predetermined value. The toilet bowl device may include the contactless water level sensor that is installed on the outer side of the bowl of the toilet bowl device or the outer side of the trap provided between the drain port and the drainage pipe at the lower portion of the bowl of the toilet bowl device and detects the water level in the bowl of the toilet bowl device. According to this aspect, it is possible to quickly detect the abnormality in which sewage overflows, which may affect a great influence, and to take appropriate measures, so that the influence can be suppressed to the minimum.

The use situation information may be the information indicating the operation state of the controller for the user of the toilet bowl device to input the operation instruction to the toilet bowl device. The abnormality detector may determine that the abnormality has occurred when acquiring the information indicating that the same button of the controller is continuously operated plural times. According to this aspect, it is possible to quickly detect even the abnormality that is difficult to detect by the patrol of the administrator.

The use situation information may be the information indicating the state of the facility or equipment installed inside or around the toilet room. The abnormality detector may determine that the abnormality has occurred when acquiring the information indicating that the time it takes for the door of the toilet room to be closed and then reopened is less than the predetermined value. According to this aspect, it is possible to appropriately detect the abnormality while suppressing the cost of the sensor or the like for detecting the abnormality.

The use situation information may include the information indicating the use state of the toilet bowl device, the information indicating the operation state of the controller for the user of the toilet bowl device to input the operation instruction to the toilet bowl device, and the information indicating the state of the facility or equipment installed inside or around the toilet room. The abnormality detector may detect the abnormality of the toilet bowl device or the facility or equipment installed inside or around the toilet room when a combination of any two or more of those pieces of information matches the predetermined conditions. The abnormality detector may determine that the abnormality has occurred when acquiring the information indicating that the door of the toilet room is closed for a predetermined time or longer and the toilet bowl device installed in that toilet room is not used for a predetermined time or longer. According to this aspect, the abnormality can be detected more accurately and quickly by referring to the plurality of information.

Another aspect of the present disclosure is a management device. The management device includes an acquirer configured to acquire use situation information related to a use situation of a toilet bowl device installed in a toilet room, and an abnormality detector configured to detect an abnormality of the toilet bowl device or a facility or equipment installed inside or around the toilet room when the use situation information acquired by the acquirer matches a predetermined condition. The abnormality that occurs in the toilet room can be detected quickly, so the toilet room can be appropriately maintained and managed.

The present disclosure further includes, in some embodiments, any one or more of the following enumerated aspects 1-1 to 1-12.

Aspect 1-1.

A toilet management system, including:

a toilet bowl device; and a management device configured to manage the toilet bowl device, in which the management device includes an acquirer configured to acquire use situation information related to a use situation of the toilet bowl device, an abnormality detector configured to detect an abnormality of the toilet bowl device or a facility or equipment installed around the toilet bowl device when the use situation information acquired by the acquirer matches a predetermined condition, and an instruction determiner configured to instruct the toilet bowl device to execute a function to be executed by the toilet bowl device according to the abnormality detected by the abnormality detector, and the toilet bowl device includes a control unit configured to execute a function instructed from the management device.

Aspect 1-2.

The toilet management system according to aspect 1-1, in which the instruction determiner instructs the toilet bowl device to stop a cleaning drainage function when the abnormality is detected by the abnormality detector.

Aspect 1-3.

The toilet management system according to aspect 1-2, in which the instruction determiner instructs the toilet bowl device to present a user that the cleaning drainage function has stopped.

Aspect 1-4.

The toilet management system according to aspect 1-2 or 1-3, in which the instruction determiner instructs the toilet bowl device to execute the cleaning drainage function when the predetermined condition is satisfied while the cleaning drainage function has stopped.

Aspect 1-5.

The toilet management system according to aspect 1-4, in which the predetermined condition includes a lapse of a predetermined time from the detection of the abnormality by the abnormality detector, a lapse of a predetermined time from the stop of the cleaning drainage function, or a detection of the reduction or elimination of the abnormality based on the use situation information.

Aspect 1-6.

The toilet management system according to any one of aspects 1-1 to 1-5, in which the management device further includes a notifier configured to notify a notification destination that the abnormality is detected according to the detected abnormality when the abnormality is detected by the abnormality detector, and the instruction determiner instructs the toilet bowl device to present the user that the notification destination has been notified that the abnormality has been detected when the notifier notifies the notification destination that the abnormality has been detected.

Aspect 1-7.

The toilet management system according to any one of aspects 1-1 to 1-6, in which the instruction determiner instructs the toilet bowl device to automatically close a lid provided in the toilet bowl device when the abnormality is detected by the abnormality detector.

Aspect 1-8.

The toilet management system according to any one of aspects 1-1 to 1-7, in which the instruction determiner instructs a device for controlling locking of a door for entering/exiting a private room provided in the toilet bowl device or toilet rooms provided in a plurality of the toilet bowl devices to automatically lock the door when the abnormality is detected by the abnormality detector.

Aspect 1-9.

The toilet management system according to any one of aspects 1-1 to 1-8, in which the instruction determiner instructs the toilet bowl device to execute a deodorizing function provided in the toilet bowl device when the abnormality is detected by the abnormality detector.

Aspect 1-10.

The toilet management system according to any one of aspects 1-1 to 1-9, in which the instruction determiner instructs the toilet bowl device to execute the cleaning drainage function when it is detected that a predetermined amount or more of toilet paper is used.

Aspect 1-11.

A toilet bowl device, including:

a toilet bowl; and a control device configured to control at least a function of cleaning the toilet bowl, in which the control device includes an acquirer configured to acquire use situation information related to a use situation of the toilet bowl device, an abnormality detector configured to detect an abnormality of the toilet bowl device when the use situation information acquired by the acquirer matches a predetermined condition, and a control unit configured to execute a function to be executed by the toilet bowl device according to the abnormality detected by the abnormality detector.

Aspect 1-12.

A control device, including:

an acquirer configured to acquire use situation information related to a use situation of a toilet bowl device;

an abnormality detector configured to detect an abnormality of the toilet bowl device when the use situation information acquired by the acquirer matches a predetermined condition; and a control unit configured to execute a function to be executed by the toilet bowl device according to the abnormality detected by the abnormality detector.

The present disclosure further includes, in some embodiments, any one or more of the enumerated aspects 2-1 through 2-6 below.

When abnormality occurs in the toilet, the toilet may not be used depending on the contents of abnormality, or sewage or an odor may spread around, which may lead to reduce the comfort of a space where people live or which people use. In particular, a toilet installed in a facility which can be used by unspecified people or many people is more frequently used and tends to be messed up as compared with a toilet installed in a house which is used by a few specific people, so the toilet is more likely to go through an abnormality. If an abnormality occurs in the toilet installed in the facility which is used by many people, the toilet can also be greatly affected by the abnormality.

The present disclosure has been made in view of such problems, and an object of the present disclosure is to provide a technology of appropriately managing a use situation of a toilet bowl device installed in a toilet room.

According to the present disclosure, it is possible to provide a technology of appropriately managing the use situation of the toilet bowl device installed in the toilet room.

Aspect 2-1.

A toilet management system, including:

a toilet bowl device configured to be provided in a toilet room;

a management device configured to manage a use situation of the toilet bowl device; and a communication device configured to transmit use situation information related to the use situation of the toilet bowl device to the management device, in which the management device includes an acquirer configured to acquire the use situation information from the communication device, an abnormality detector configured to detect an abnormality of the toilet bowl device or a facility or equipment installed inside or around the toilet room when the use situation information acquired by the acquirer matches a predetermined condition, and a notifier configured to notify a notification destination of information on the detected abnormality according to contents of the abnormality detected by the abnormality detector.

Aspect 2-2.

The toilet management system according to aspect 2-1, in which the notifier notifies any of a subject in charge of managing the facility in which the toilet room is installed, a subject in charge of cleaning the toilet room, a subject manufacturing the toilet bowl device or a facility or equipment installed inside or around the toilet room, and a subject in charge of maintenance of the toilet bowl device or the facility or equipment installed inside or around the toilet room of the information on the detected abnormality.

Aspect 2-3.

The toilet management system according to 2-1 or 2-2, further including an abnormality notification means installed inside or around the toilet room, in which the notifier notifies the abnormality notification means of an occurrence of the abnormality when the abnormality is detected by the abnormality detector.

Aspect 2-4.

The toilet management system according to any one of aspects 2-1 to 2-3, in which the notifier notifies a subject managing a floor below a floor on which the toilet room is installed of the information on the abnormality in addition to a subject managing a floor on which the toilet room is installed, when an abnormality that sewage overflows from the toilet bowl device is detected in the toilet bowl device installed in the toilet room installed on an upper floor of a building having a plurality of floors.

Aspect 2-5.

A management device, including an acquirer configured to acquire use situation information related to a use situation of a toilet bowl device installed in a toilet room;

an abnormality detector configured to detect an abnormality of the toilet bowl device or a facility or equipment installed inside or around the toilet room when the use situation information acquired by the acquirer matches a predetermined condition; and a notifier configured to notify a notification destination of information on the detected abnormality according to contents of the abnormality detected by the abnormality detector.

Aspect 2-6.

A program allowing a computer to function as an acquirer configured to acquire use situation information related to a use situation of a toilet bowl device installed in a toilet room;

an abnormality detector configured to detect an abnormality of the toilet bowl device or a facility or equipment installed inside or around the toilet room when the use situation information acquired by the acquirer matches a predetermined condition; and a notifier configured to notify a notification destination of information on the detected abnormality according to contents of the abnormality detected by the abnormality detector.

The present disclosure further includes, in some embodiments, any one or more of the enumerated aspects 3-1 through 3-10 below.

In recent years, many large-scale commercial facilities or complex facilities have been opened, but the more the number of people who use the facilities is increased, the more the toilets need to be installed. Since a lot of labor is required to appropriately maintain and manage a large number of toilets installed daily, a technology of appropriately and efficiently maintaining and managing a large number of toilets is required.

The present disclosure has been made in view of such problems, and an object of the present disclosure is to provide a technology of appropriately managing a plurality of toilet bowl devices.

According to the present disclosure, it is possible to provide a technology of appropriately managing a plurality of toilet bowl devices.

Aspect 3-1.

A toilet management system, including:

a plurality of toilet bowl devices installed in a toilet room;

a management device configured to comprehensively manage the plurality of toilet bowl devices; and a communication device configured to transmit use situation information related to the use situation of the plurality of toilet bowl devices to the management device, in which the management device includes an acquirer configured to acquire the use situation information of the plurality of toilet bowl devices from the communication device, a determiner configured to determine timing to instruct the toilet bowl device to execute a predetermined operation or function based on the use situation information of the plurality of toilet bowl devices acquired by the acquirer, and an instruction transmitter configured to transmit the instruction of the execution of the predetermined operation or function to the toilet bowl device at the timing determined by the determiner, and the toilet bowl device includes an instruction receiver configured to receive the instruction of the execution of the predetermined operation or function from the management device, and a control unit configured to execute the predetermined operation or function based on the instruction received by the instruction receiver.

Aspect 3-2.

The toilet management system according to aspect 3-1, in which the determiner determines the timing to instruct the toilet bowl device to execute the predetermined operation or function so that the predetermined number or more of the toilet bowl devices do not execute the operation or function at the same time when the determiner causes the plurality of toilet bowl devices to execute the predetermined operation or function that consumes power of a predetermined value or more.

Aspect 3-3.

The toilet management system according to aspect 3-1 or 3-2, in which the determiner determines the timing to instruct the toilet bowl device to execute the predetermined operation or function so that the predetermined number or more of the toilet bowl devices connected to the same water supply pipe or drainage pipe do not execute the operation or function at the same time when the determiner causes the plurality of toilet bowl devices to execute a predetermined operation or function involving water supply or drainage.

Aspect 3-4.

The toilet management system according to any one of aspects 3-1 to 3-3, in which the determiner determines timing to instruct the toilet bowl device to execute the predetermined operation or function involving the drainage so that among the plurality of toilet bowl devices connected to the same drainage pipe, a toilet bowl device connected to an upstream side of the drainage pipe has a drainage frequency, a time, or a drainage volume more than those of the toilet bowl device connected to a downstream side thereof Aspect 3-5.

The toilet management system according to any one of aspects 3-1 to 3-4, in which in executing the predetermined operation or function, the control unit inquires of the management device whether or not other toilet bowl devices executing the operation or function exist around the toilet bowl device, the management device further includes a responder configured to acquire information on the executing operation or function from the plurality of toilet bowl devices, check whether other toilet bowl devices that are executing the predetermined operation or function exist around the toilet bowl device when the toilet bowl device inquires whether or not other toilet bowl devices that are executing the predetermined operation or function exist around the toilet bowl device, and return a response to the check the control unit determines whether or not to execute the operation or function or the timing to execute the operation or function according to the response from the management device.

Aspect 3-6.

The toilet management system according to aspect 3-5, in which in executing the predetermined operation or function involving the drainage, the control unit inquires of the management device whether or not the other toilet bowl devices that are executing the operation or function exists around the toilet bowl device, and stops or postpones the execution of the operation or function when there is a response from management device that the other toilet bowl devices exist.

Aspect 3-7.

A management device, including: an acquirer configured to acquire use situation information of a plurality of toilet bowl devices installed in a toilet room;

a determiner configured to determine timing to instruct the toilet bowl device to execute a predetermined operation or function based on the use situation information of the plurality of toilet bowl devices acquired by the acquirer; and an instruction transmitter configured to transmit the instruction of the execution of the predetermined operation or function to the toilet bowl device at the timing determined by the determiner.

Aspect 3-8.

A program allowing a computer to execute the following: an acquirer configured to acquire use situation information of a plurality of toilet bowl devices installed in a toilet room;

a determiner configured to determine timing to instruct the toilet bowl device to execute a predetermined operation or function based on the use situation information of the plurality of toilet bowl devices acquired by the acquirer; and an instruction transmitter configured to transmit the instruction of the execution of the predetermined operation or function to the toilet bowl device at the timing determined by the determiner.

Aspect 3-9.

A toilet bowl device, including:

a communicator configured to communicate with a management device comprehensively managing a plurality of toilet bowl devices installed in a toilet room;

a control unit configured to execute an operation or function executable by the toilet bowl device, in which in executing a predetermined operation or function involving drainage, the control unit inquires of the management device whether or not the other toilet bowl devices that are executing the operation or function exists around the toilet bowl device, and stops or postpones the execution of the operation or function when there is a response from management device that the other toilet bowl devices exist.

Aspect 3-10.

A program allowing a computer to function as a communicator configured to communicate with a management device comprehensively managing a plurality of toilet bowl device installed in a toilet room; and a control unit configured to execute an operate or function executable by the toilet bowl device, in which in executing a predetermined operation or function involving drainage, the control unit inquires of the management device whether or not the other toilet bowl devices that are executing the operation or function exist around the toilet bowl device, and stops or postpones the execution of the operation or function when there is a response from management device that the other toilet bowl devices exist.

The present disclosure further includes, in some embodiments, any one or more of enumerated aspects 4-1 through 4-5 below.

In recent years, many large-scale commercial facilities or complex facilities have been opened, but the more the number of people who use the facilities is increased, the more the toilets need to be installed. Since a lot of labor is required to appropriately maintain and manage a large number of toilets installed daily, a technology of appropriately and efficiently maintaining and managing a large number of toilets is required.

The present disclosure has been made in view of such problems, and an object of the present disclosure is to provide a technology of appropriately managing cleaning of a plurality of toilet rooms.

According to the present disclosure, it is possible to provide a technology of appropriately managing cleaning of a plurality of toilet rooms.

Aspect 4-1.

A toilet management system, including:

a toilet bowl device configured to be provided in a toilet room;

a management device configured to manage a use situation of the toilet bowl device; and a communication device configured to transmit use situation information related to the use situation of the toilet bowl device to the management device, in which the management device includes an acquirer configured to acquire the use situation information from the communication device, a determiner configured to determine timing or contents of cleaning the toilet room based on the use situation information acquired by the acquirer, and a notifier configured to notify a subject in charge of cleaning the toilet room of the timing or contents determined by the determiner.

Aspect 4-2.

The toilet management system according to aspect 4-1, in which the determiner determines the timing to clean the toilet room so that a cleaning frequency of the toilet room in which the installed toilet bowl device is used more frequently is higher than that of the toilet room in which the installed toilet bowl device is used less frequently.

Aspect 4-3.

The toilet management system according to aspect 4-1 or 4-2, in which the determiner determines the contents of the cleaning of the toilet room so that the number of items or a range of the cleaning of the toilet room in which the installed toilet bowl device is used more frequently is larger than that of the toilet room in which the installed toilet bowl device is used less frequently.

Aspect 4-4.

A management device, including:
an acquirer configured to acquire use situation information related to a use situation of a toilet bowl device installed in a toilet room;
a determiner configured to determine timing or contents of cleaning the toilet room based on the use situation information acquired by the acquirer, and
a notifier configured to notify a subject in charge of cleaning the toilet room of the timing or contents determined by the determiner.

Aspect 4-5.

A program allowing a computer to function as
an acquirer configured to acquire use situation information related to a use situation of a toilet bowl device installed in a toilet room;
a determiner configured to determine timing or contents of cleaning the toilet room based on the use situation information acquired by the acquirer; and
a notifier configured to notify a subject in charge of cleaning the toilet room of the timing or contents determined by the determiner.

The present disclosure is applicable to a toilet management system for managing the use situation of the toilet bowl device installed in the toilet room.

The invention claimed is:

1. A toilet management system, comprising:
a toilet bowl device installed in a toilet room;
a management device configured to manage a use situation of the toilet bowl device; and
a communication device configured to transmit use situation information related to the use situation of the toilet bowl device to the management device,
wherein the management device includes:
an acquirer configured to acquire the use situation information from the communication device, and
an abnormality detector configured to detect an abnormality of the toilet bowl device or a facility or equipment installed inside or around the toilet room when the use situation information acquired by the acquirer matches a predetermined condition,
wherein the use situation information is information indicating the state of the facility or equipment inside or around the toilet room, and
wherein the abnormality detector determines that the abnormality occurs when acquiring information indicating that a time it takes for a door of the toilet room to be closed and then reopened is less than a predetermined value.

2. The toilet management system of claim 1, wherein the use situation information is information indicating the use state of the toilet bowl device.

3. The toilet management system of claim 2, wherein the abnormality detector determines that an abnormality has occurred when acquiring information indicating that an amount of water in a bowl of the toilet bowl device exceeds a predetermined value.

4. The toilet management system of claim 3, wherein the toilet bowl device includes a contactless water level sensor that is installed on an outer side of the bowl of the toilet bowl device or an outer side of a trap provided between a drain port and a drainage pipe at a lower portion of the bowl of the toilet bowl device and detects a water level in the bowl of the toilet bowl device.

5. The toilet management system of claim 1, wherein the use situation information is information indicating an operation state of a controller for a user of the toilet bowl device to input an operation instruction to the toilet bowl device.

6. The toilet management system of claim 5, wherein the abnormality detector determines that the abnormality occurs when acquiring information indicating that the same button of the controller is continuously operated plural times.

7. The toilet management system of claim 1, wherein the use situation information includes the information indicating the use state of the toilet bowl device, the information indicating the operation state of the controller for the user of the toilet bowl device to input the operation instruction to the toilet bowl device, and the information indicating the state of the facility or equipment installed inside or around the toilet room, and
the abnormality detector detects the abnormality of the toilet bowl device or the facility or equipment installed inside or around the toilet room when a combination of any two or more of those pieces of information matches the predetermined condition.

8. The toilet management system of claim 7, wherein the abnormality detector determines that the abnormality occurs when acquiring information indicating that the door of the toilet room is closed for a predetermined time or longer and the toilet bowl device installed in that toilet room is not used for a predetermined time or longer.

9. A management device, comprising:
an acquirer configured to acquire use situation information related to a use situation of a toilet bowl device installed in a toilet room; and
an abnormality detector configured to detect an abnormality of the toilet bowl device or a facility or equipment installed inside or around the toilet room when the use situation information acquired by the acquirer matches a predetermined condition,
wherein the use situation information is information indicating the state of the facility or equipment inside or around the toilet room, and
wherein the abnormality detector determines that the abnormality occurs when acquiring information indicating that a time it takes for a door of the toilet room to be closed and then reopened is less than a predetermined value.

10. A non-transitory computer-readable storage medium storing a program configured to be executed by one or more processors of a management device comprising an acquirer and an abnormality detector, wherein executing the instructions causes the management device to:
acquire, by the acquirer, use situation information related to a use situation of a toilet bowl device installed in a toilet room; and
detect, by the abnormality detector, an abnormality of the toilet bowl device or a facility or equipment installed inside or around the toilet room when the use situation information acquired by the acquirer matches a predetermined condition,
wherein the use situation information is information indicating the state of the facility or equipment inside or around the toilet room, and
wherein the abnormality detector determines that the abnormality occurs when acquiring information indicating that a time it takes for a door of the toilet room to be closed and then reopened is less than a predetermined value.

\* \* \* \* \*